(12) United States Patent
Hatori

(10) Patent No.: US 9,302,435 B2
(45) Date of Patent: Apr. 5, 2016

(54) BUS BAR ASSEMBLY AND METHOD OF MANUFACTURING THE SAME

(71) Applicant: DENSO CORPORATION, Kariya, Aichi-pref. (JP)

(72) Inventor: Kouji Hatori, Obu (JP)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 14/035,359

(22) Filed: Sep. 24, 2013

(65) Prior Publication Data
US 2014/0116751 A1 May 1, 2014

(30) Foreign Application Priority Data
Oct. 31, 2012 (JP) ................. 2012-240159

(51) Int. Cl.
B29C 70/84 (2006.01)
H02M 7/00 (2006.01)
H02G 5/00 (2006.01)

(52) U.S. Cl.
CPC ............... *B29C 70/84* (2013.01); *H02M 7/003* (2013.01); *H02G 5/005* (2013.01)

(58) Field of Classification Search
USPC ........................................................ 174/70 B
See application file for complete search history.

(56) References Cited

U.S. PATENT DOCUMENTS

| | | | | |
|---|---|---|---|---|
| 2,074,113 | A * | 3/1937 | Hovey | A61F 5/50 128/880 |
| 6,019,928 | A * | 2/2000 | Fujitani | F02M 51/005 264/263 |
| 6,707,689 | B2 * | 3/2004 | Momota | H01R 9/226 174/72 A |
| 2001/0001071 | A1 * | 5/2001 | Takahashi | 438/127 |
| 2001/0006688 | A1 * | 7/2001 | Soga | B29C 45/14221 425/127 |
| 2002/0053456 | A1 * | 5/2002 | Nishida | 174/70 B |
| 2010/0065862 | A1 * | 3/2010 | Ray | B82Y 20/00 257/88 |
| 2010/0096184 | A1 * | 4/2010 | Ambo | B60R 16/0215 174/72 A |

(Continued)

FOREIGN PATENT DOCUMENTS

| | | |
|---|---|---|
| JP | 2004-313000 | 11/2004 |
| JP | 2011-35277 | 2/2011 |
| JP | 2011-135712 | 7/2011 |
| JP | 2011-143711 | 7/2011 |

OTHER PUBLICATIONS

Office Action (2 pgs.) dated Sep. 2, 2014 issued in corresponding Japanese Application No. 2012-240159 with an at least partial English-language translation thereof (2 pgs.).

(Continued)

*Primary Examiner* — Jeremy C Norris
*Assistant Examiner* — Muhammed Azam
(74) *Attorney, Agent, or Firm* — Nixon & Vanderhye P.C.

(57) ABSTRACT

A bus bar assembly comprises a plurality of conductive plate-shaped bus bars and a resin mold section in which a plurality of conductive plate-shaped bus bars are partially embedded. In a method for manufacturing the bus bar assembly, firstly a plurality of conductive plate-shaped bus bars are disposed within a cavity formed by a die such as to be stacked in a thickness direction Z with a predetermined amount of space therebetween. Second, a first end and a second end of each bus bar are respectively supported by jigs in the width direction Y. Next, the cavity in the die is filled with the insulating resin and the plurality of bus bars are molded into a single body. After that, jigs are removed from the bus bars and jig placement portions are formed in the resin mold section.

4 Claims, 13 Drawing Sheets

(56) References Cited

U.S. PATENT DOCUMENTS

| | | | |
|---|---|---|---|
| 2010/0226140 A1* | 9/2010 | Mochizuki | B60Q 3/0203 362/373 |
| 2011/0127061 A1* | 6/2011 | Gotou | H02M 7/003 174/68.2 |
| 2011/0143111 A1 | 6/2011 | Yamamoto et al. | |
| 2011/0155414 A1 | 6/2011 | Yasukawa et al. | |

OTHER PUBLICATIONS

Office Action (2 pages) dated Mar. 31, 2015, issued in corresponding Japanese Application No. 2012-240159 and English translation (2 pages).

* cited by examiner

BUS BAR ASSEMBLY AND METHOD OF MANUFACTURING THE SAME

CROSS-REFERENCE TO RELATED APPLICATION

This application is based on and claims the benefit of priority from earlier Japanese Patent Application No. 2012-240159 filed Oct. 31, 2012, the description of which is incorporated herein by reference.

BACKGROUND OF THE INVENTION

1. Field of the Invention

The present invention relates to a bus bar assembly formed by a plurality of bus bars being molded by an insulating resin, and a method for manufacturing the bus bar assembly.

2. Description of the Related Art

A power conversion device that converts direct-current power from a battery to alternating-current power is used in hybrid vehicles and electric cars. Electrical components, such as switching elements, capacitors, and reactors, are included within the power conversion device. A bus bar composed of a conductor is used to connect the terminals of these electric components.

JP-A-2011-35277 discloses a bus bar assembly that includes a plurality of bus bars and a resin mold section. The bus bars are stacked with a predetermined amount of space therebetween. The resin mold section is composed of an insulating resin and formed such as to mold the plurality of bus bars into a single body. According to JP-A-2011-35277, the bus bars are disposed such that adjacent bus bars face each other. As a result, inductance in the bus bars which causes surge voltage to occur can be reduced.

However, in the bus bar assembly in JP-A-2011-35277, when the plurality of bus bars are molded by the insulating resin, each bus bar is fixed by being sandwiched by jigs from both sides in the thickness direction. Therefore, each bus bar is provided with through-holes for placing the jigs for fixing the other bus bars. As a result, the surface area of the bus bar is reduced by an amount equivalent to the through-holes. In other words, the facing area of adjacent bus bars is reduced. As a result, inductance may not be sufficiently reduced. This problem becomes more significant as the number of bus bars increases.

On the other hand, in the structure of the bus bar assembly in JP-A-2011-35277, when the facing area of the adjacent bus bars is increased, the size of the bus bars themselves is required to be increased. When the size of the bus bars is increased, a problem occurs in that the overall bus bar assembly increases in size.

For these reasons, a bus bar assembly in which inductance can be sufficiently reduced and a method for manufacturing the bus bar assembly are desired.

SUMMARY

As an exemplary embodiment, the present application provides a bus bar assembly that includes a plurality of conductive plate-shaped bus bars and a resin mold section. The plurality of conductive bus bars are stacked in a thickness direction with a predetermined amount of space therebetween. The resin mold section is composed of an insulating resin and formed such as to mold the plurality of bus bars into a single body. Also the resin mold section is provided with jig placement portions which is suitable for placing jigs for respectively supporting a first end and a second end in a width direction perpendicular to the thickness direction of each bus bar, when the plurality of bus bars were molded by the insulating resin. (First aspect of the bus bar assembly of the present invention)

As described above, the resin mold section of the bus bar assembly is formed such as to mold the plurality of bus bars into a single body. The resin mold section can be formed, for example, such as to partially (i.e. not entirely) mold each bus bar. In addition, a width direction Y of the bus bar is a direction Y perpendicular to the thickness direction Z of the bus bar, and is the shorter-length direction of the bus bar.

In the above-described bus bar assembly, the resin mold section is provided with the jig placement portions for the placement of the jigs for respectively supporting the first end and the second end in the width direction Y of each bus bar, when the plurality of bus bars are molded by the insulating resin. Each jig placement portion can be single or multiple. Therefore, when the plurality of bus bars are molded by the insulating resin, the first end and the second end in the width direction Y of each bus bar are supported by the jigs disposed in the area to become the jig placement portions of the resin mold section. Each bus bar can be sufficiently positioned.

In other words, for example, through-holes for placing jigs to sandwich and fix the other bus bars in the thickness direction, as required in the past, are no longer required to be provided in the bus bar. Therefore, the facing area of adjacent bus bars can be sufficiently ensured without enlarging the shape of the bus bar itself. As a result, inductance in the bus bar assembly can be sufficiently reduced.

In addition, the above-described jig placement portion on the first end in the width direction Y of the bus bar may have some concavity in the cross-section parallel to the thickness direction and the width direction Y of the bus bar. (second aspect of the bus bar assembly of the present invention).

In this instance, as a result of the jig placement portion of the resin mold section having concavity, when the plurality of bus bars are molded by the insulating resin, the first end in the width direction of each bus bar can be supported from both sides in the thickness direction by the jig having concavity and disposed in the jig placement portion. In other words, the first end in the width direction of the bus bar can be supported not only in the width direction but also in the thickness direction Z. As a result, the bus bars can be molded by the resin mold section composed of the insulating resin in a state in which the bus bars are accurately positioned by the jig. Insulation between adjacent bus bars can be sufficiently ensured. In addition, inductance can be further reduced.

In addition, the jig placement portions on both ends (first end and second end in the width direction Y of the bus bar can have concavity. As a result, both ends (first end and second end) in the width direction Y of each bus bar can be supported in the width direction Y and the thickness direction Z, and positioned. Accuracy of positioning of the bus bars can be further enhanced. The jug placement portion on the first end in the width direction Y of each bus bar refers to a jig placement portion for placement of a jig for supporting an end in the width direction Y of the bus bar.

In addition, the jig placement portions respectively corresponding to the two bus bars disposed adjacent to each other may be provided alternately with each other in the length direction X perpendicular to the thickness direction Z and the width direction Y of the bus bar. (third aspect of the bus bar assembly of the present invention).

In this instance, distance between the jig placement portions in the resin mold section can be sufficiently ensured. As a result, the distance between adjacent bus bars can be reduced and space can be saved. Compactness of the bus bar assembly can be actualized. In addition, in the instance of a configuration in which portions of the bus bars are exposed in the jig placement portions, the distance between bus bars can be sufficiently ensured. As a result, insulation between the bus bars can be sufficiently ensured.

The jig placement portions corresponding to the bus bar refers to a jig placement portion for placement of jigs for supporting both ends in the width direction Y of the bus bar. In addition, the length direction X of the bus bar refers to a direction perpendicular to the thickness direction Z and the width direction Y of the bus bar, i.e. longitudinal of the bus bar.

In addition, the above-described bus bar assembly may include three or more of the above-described bus bars. (fourth aspect of the bus bar assembly of the present invention).

In other words, for example, in a conventional structure, the number of through-holes provided for placement of the jigs increases as the number of bus bars increases. The facing area of adjacent bus bars decreases by an amount equivalent to the increase in the number of through-holes. Therefore, when the number of bus bars is three or more, the effect achieved as a result of the above-described through-holes no longer being required in the bus bars can be further achieved. In other words, the effect of sufficiently ensuring the facing area between adjacent bus bars can be further achieved. Inductance can be further reduced.

In addition, as a typical example, the present application provides a method for manufacturing a bus bar assembly. The method for manufacturing a bus bar assembly comprises a bus bar placement process, a molding process, and a jig removal process.

In the bus bar placement process, a plurality of conductive plate-shaped bus bars are disposed within a cavity formed by a die such as to be stacked in a thickness direction with a predetermined amount of space therebetween, and a first end and a second end of each bus bar are respectively supported by a first jig and a second jig in the width direction Y.

In the molding process, the cavity in the die is filled with the insulating resin and the plurality of bus bars are molded into a single body by the insulating resin, thereby the resin mold section is formed.

In the jig removal process, the jigs are removed from each bus bar and jig placement portions are formed in the resin mold section. (First aspect of the method for manufacturing a bus bar assembly of the present invention)

In the bus bar placement process, the plurality of bus bars are disposed within the cavity of the die. The one end and the other end in the width direction Y of each bus bar are respectively supported by the jigs. In the molding process, in a state in which the one end and the other end in the width direction Y of each bus bar are respectively supported by the jigs and the bus bars are sufficiently positioned, the plurality of bus bars are molded by the insulating resin.

Therefore, as described above, for example, through-holes for placing the jigs to sandwich and fix the other bus bars in the thickness direction, as required in the past, are no longer required to be provided in the bus bar. Therefore, the facing area of adjacent bus bars can be sufficiently ensured without increasing the size of the bus bar itself. As a result, the above-described bus bar assembly in which inductance can be sufficiently reduced can be easily manufactured.

In the above-described method for manufacturing a bus bar assembly, the jig for supporting the first end and the second end in the width direction Y of each bus bar in the bus bar placement process may be a single or multiple.

In addition, the die is comprised of a first die which is disposed on the first end, and a second die which is disposed on the second end.

The first die is provided with the jig having concavity. In the bus bar placement process, each first end of the bus bars is placed within the concavity of the first jig in the first die. (second aspect of the method for manufacturing a bus bar assembly of the present invention).

In this instance, the first end in the width direction Y of each bus bar can be supported in the width direction Y and the thickness direction Z by the concavity of the jig provided in the first die. In other words, the bus bars can be accurately positioned by only the first die of the dies. As a result, in the bus bar placement process, positioning of the bus bars is facilitated. In addition, when the bus bar is placed in the concavity of the jig in the first die first, a subsequent operation of disposing the second die on the first die can be facilitated. The first die and the jig provided in the first die may be configured separately or as a single body.

As described above, according to the present application, a bus bar assembly in which inductance can be sufficiently reduced and a method for manufacturing the bus bar assembly can be provided.

DETAILED DESCRIPTION OF THE PREFERRED EMBODIMENTS

A bus bar assembly and a method for manufacturing the bus bar assembly according to an embodiment of the present invention will hereinafter be described with reference to the drawings.

(First Embodiment)

First embodiment of the present invention will hereinafter be described with reference to FIG. 1 to FIG. 18.

Figure 1:
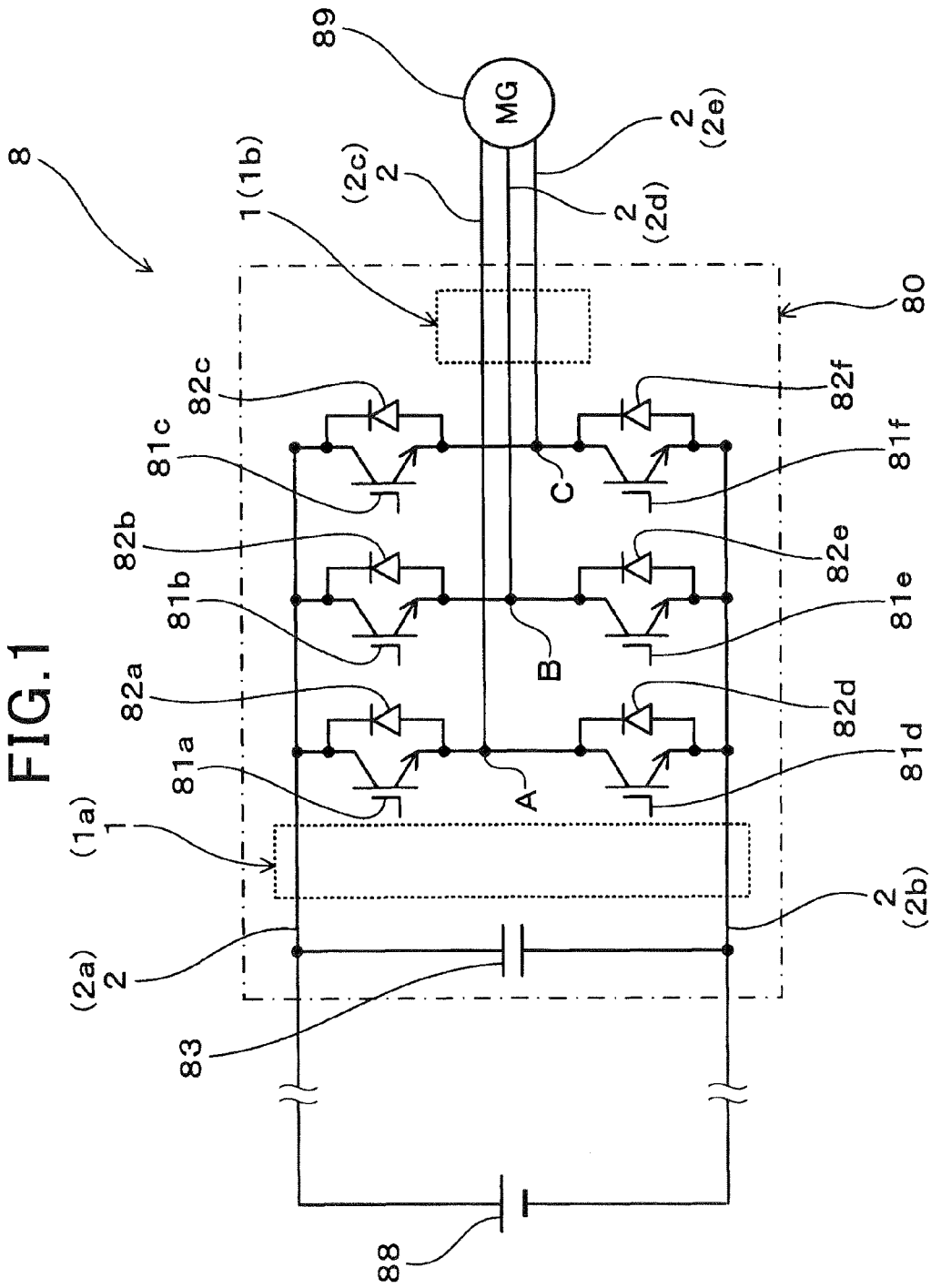
FIG. 1 shows a circuit diagram of a power conversion device according to first and second embodiments.

FIG. 1 illustrates a circuit diagram of a power conversion device according to a first embodiment. As shown in FIG. 1, a bus bar assembly 1 (1a) according to the first embodiment is applied to a power conversion device 8 that controls a three-phase alternating-current motor 89 for cruising that is mounted in a vehicle. The power conversion device 8 includes an inverter 80 that drives the three-phase alternating-current motor 89. Inverter insulated-gate bipolar transistors (IGBTs) 81a to 81f, freewheeling diodes 82a to 82f, and a capacitor 83 are disposed in the inverter 80.

As shown in FIG. 1, the inverter IGBTs 81a to 81f are switching elements that are repeatedly turned ON and OFF accordingly to convert direct-current voltage inputted into the inverter 80 to alternating-current voltage. The collectors of the inverter IGBTs 81a to 81c are connected to the positive-electrode side of a high voltage battery 88 with a positive-electrode bus bar 2a therebetween. The emitters of the inverter IGBTs 81d to 81f are connected to the negative-electrode of the high-voltage battery 88 with a negative-electrode bus bar 2b therebetween.

As shown in FIG. 1, a connection point A between the inverter IGBTs 81a and 81d, a connection point B between the inverter IGBTs 81b and 81e, and the connection point C between the inverter IGBTs 81c and 81f are connected to the U phase, the V phase, and the W phase of the three-phase alternating-current motor 89 via a plurality of bus bars 2, or in other words, a U-phase bus bar 2c, a V-phase bus bar 2d, and a W-phase bus bar 2e therebetween.

As shown in FIG. 1, the anodes of the freewheeling diodes 82a to 82f are connected to the emitters of the inverter IGBTs 81a to 81f. In addition, the cathodes of the freewheeling diodes 82a to 82f are connected to the collectors of the inverter IGBTs 81a to 81f.

As shown in FIG. 1, the capacitor 83 is an element for smoothing the direct-current voltage. The capacitor 83 is disposed within the inverter 80 such as to connect between the positive-electrode bus bar 2a and the negative-electrode bus bar 2b. The bus bar assembly 1 (1a) is disposed within the inverter 80 in a state in which the positive-electrode bus bar 2a and the negative-electrode bus bar 2b are molded into a single body by an insulating resin.

Figure 2:
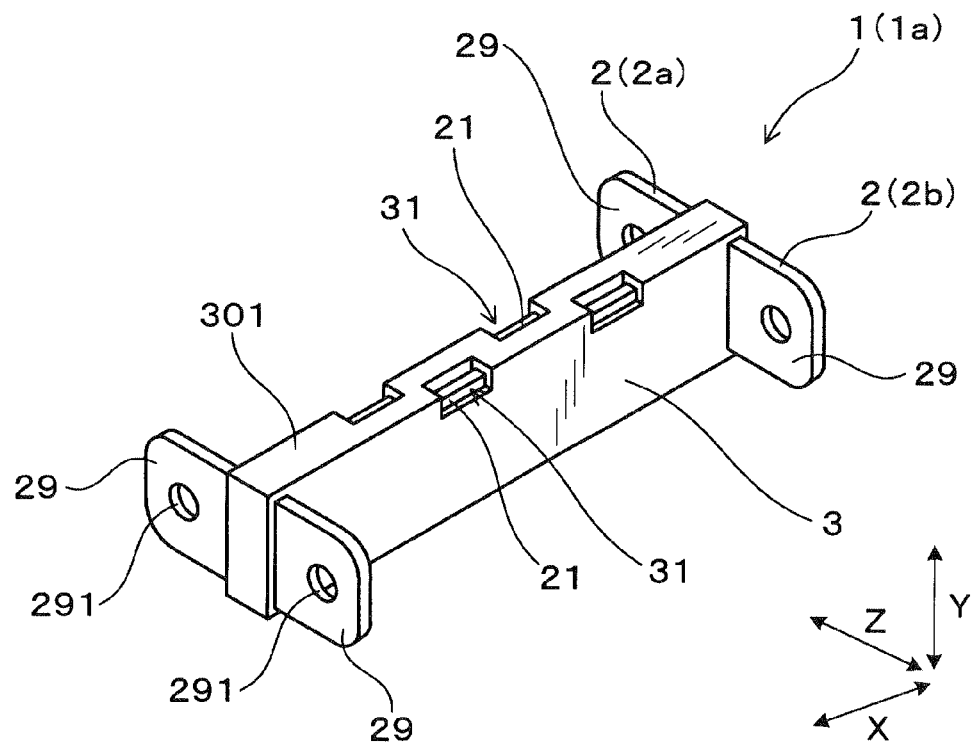
FIG. 2 shows a perspective view of a bus bar assembly according to the first embodiment.
Figure 3:
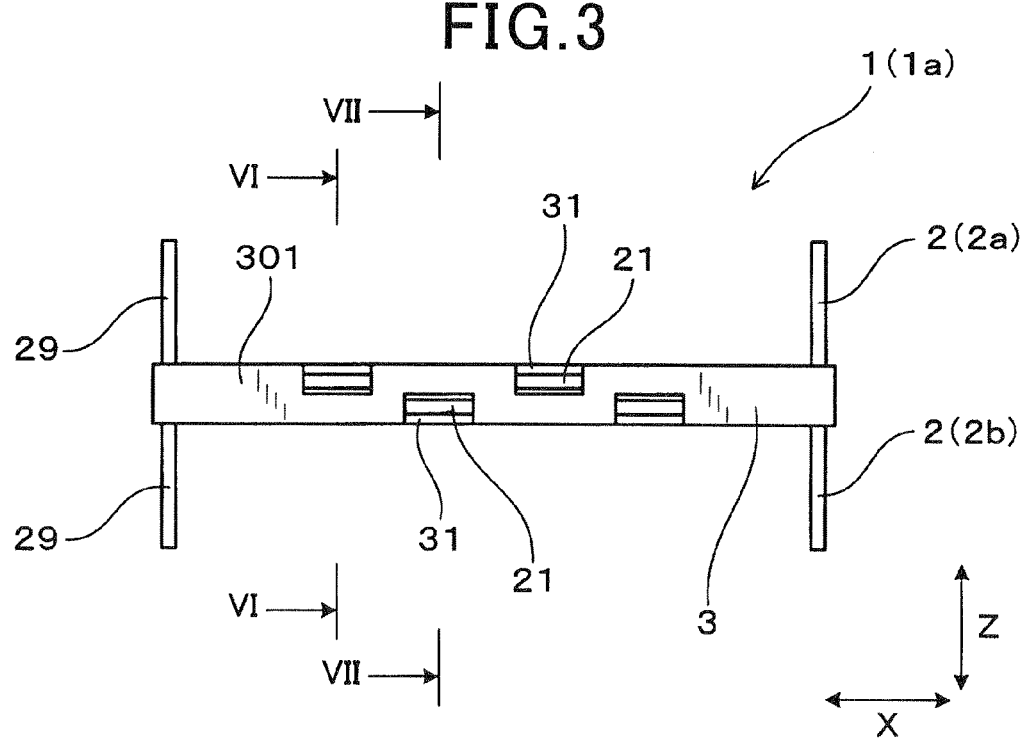
FIG. 3 shows a planar view of the bus bar assembly according to the first embodiment.
Figure 4:
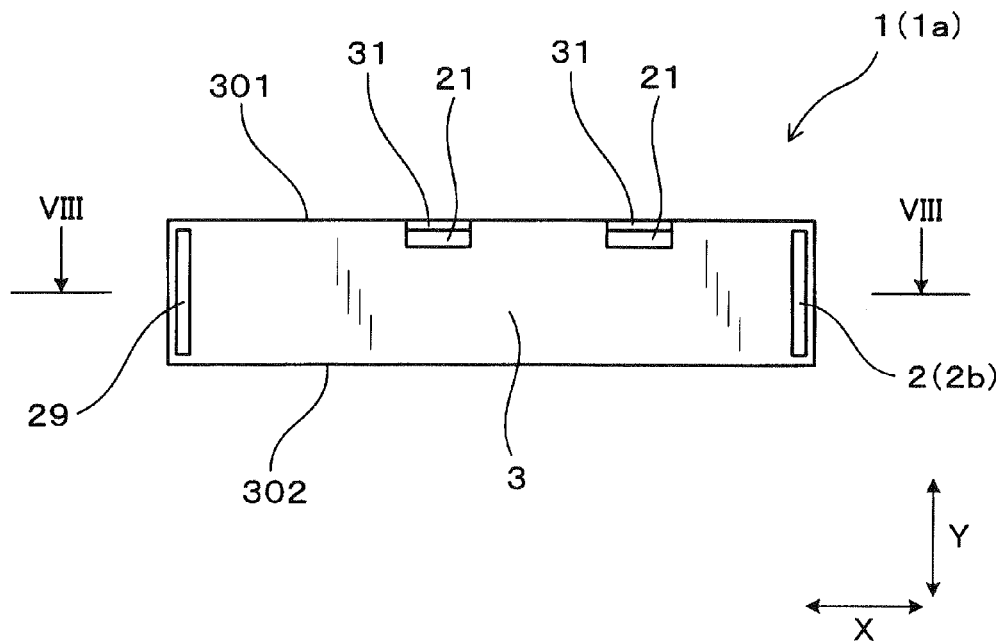
FIG. 4 shows a side view of the bus bar assembly according to the first embodiment.
Figure 5:
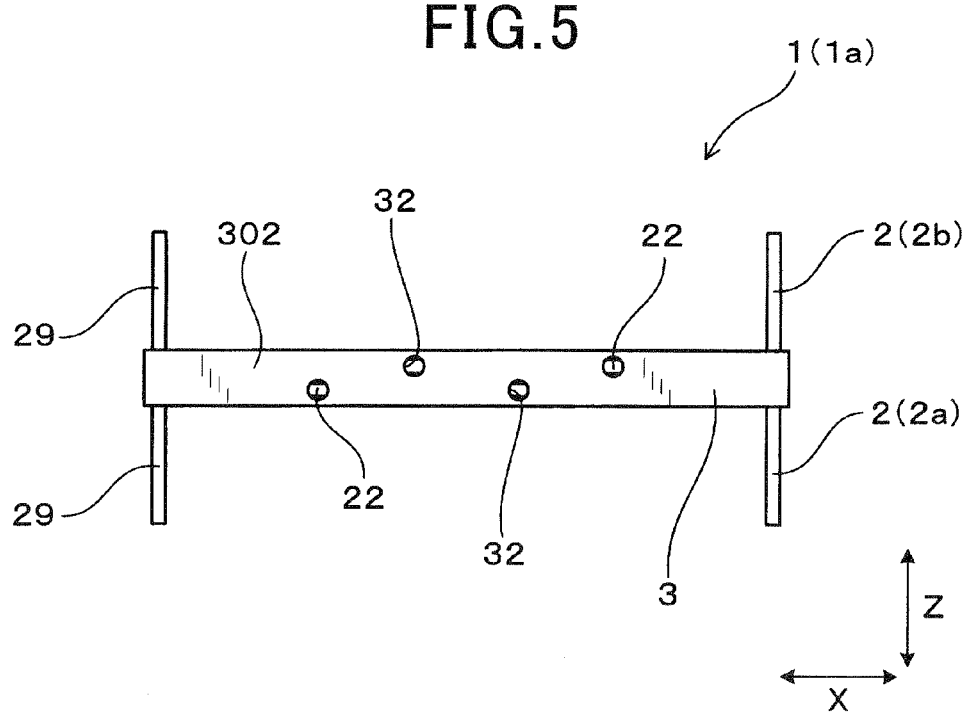
FIG. 5 shows a bottom view of the bus bar assembly according to the first embodiment.

A detailed structure of the bus bar assembly 1 (1a) is shown in FIG. 2 to FIG. 5. FIG. 2 illustrates a perspective view of the bus bar assembly according to the first embodiment. FIG. 3 illustrates a planar view of the bus bar assembly. FIG. 4 illustrates a side view of the bus bar assembly. FIG. 5 illustrates a bottom view of the bus bar assembly. As shown in FIG. 2 to FIG. 5, the bus bar assembly 1 (1a) includes the positive-electrode bus bar 2a and the negative-electrode bus bar 2b. The positive-electrode bus bar 2a and the negative-electrode bus bar 2b are composed of flat copper plates.

Figure 8:
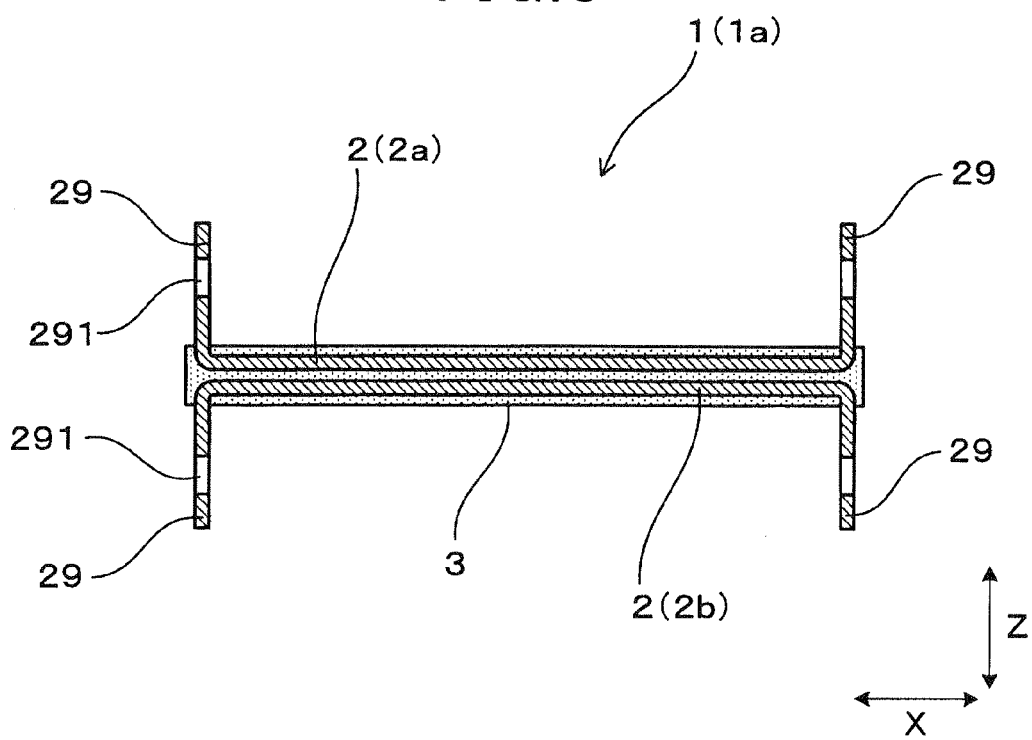
FIG. 8 shows a cross-sectional view taken along line VIII-VIII in FIG. 4, viewed from the arrow direction.

FIG. 8 illustrates a cross-sectional view taken along line VIII-VIII in FIG. 4 (side view), viewed from the arrow direction. As shown in FIG. 8, the positive-electrode bus bar 2a and the negative-electrode bus bar 2b are stacked in a thickness direction Z with a predetermined amount of space therebetween. In addition, the positive-electrode bus bar 2a and the negative-electrode bus bar 2b are disposed such that a main surface (surface perpendicular to the thickness direction Z) of each faces a main surface of the other. In addition, part of the stacked sections of the positive-electrode bus bar 2a and the negative-electrode bus bar 2b is molded into a single body by a resin mold section 3. The resin mold section 3 is composed of polyphenylene sulfide (PPS) resin that is an insulating resin.

As shown in FIG. 2 (perspective view), terminal portions 29 on both ends in a length direction X (direction perpendicular to a width direction Y and the thickness direction Z) of the positive-electrode bus bar 2a and the negative-electrode bus bar 2b respectively project towards both sides in the thickness direction Z from the resin mold section 3. In addition, each terminal section 29 is provided with a fixing through-hole 291 for fixing the terminal portion 29 to another component.

As shown in FIG. 3 (planar view) and FIG. 4 (perspective view), one end surface 301 in the width direction Y of the resin mold section 3 is provided with a total of four jig placement portions 31. Two jig placement portions 31 each are provided for the positive-electrode bus bar 2a and the negative-electrode bus bar 2b. The jig placement portion 31 is used for the placement of a jig (first jig 51) for supporting one end 21 in the width direction Y of the positive-electrode bus bar 2a and the negative-electrode bus bar 2b. The two jig placement portions 31 corresponding to the positive-electrode bus bar 2a and the two jig placement portions 31 corresponding to the negative-electrode bus bar 2b are disposed alternately with each other in the length direction X.

Figure 6:
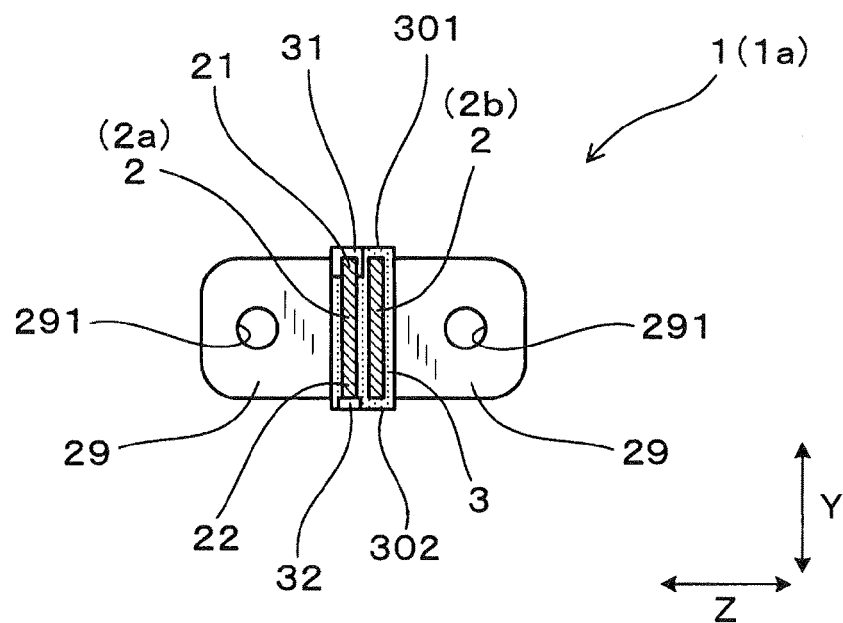
FIG. 6 shows a cross-sectional view taken along line VI-VI in FIG. 3, viewed from the arrow direction.
Figure 7:
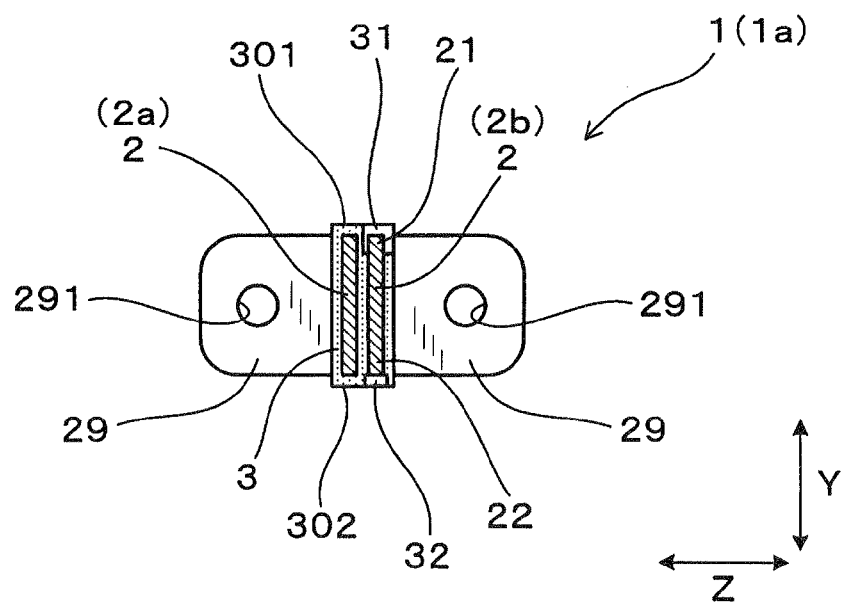
FIG. 7 shows a cross-sectional view taken along line VII-VII in FIG. 3, viewed from the arrow direction.

FIG. 6 illustrates a cross-sectional view taken along line VI-VI in FIG. 3 (planar view), viewed from the arrow direction. FIG. 7 illustrates a cross-sectional view taken along line VII-VII in FIG. 3 (planar view), viewed from the arrow direction. As shown in FIG. 6 and FIG. 7, the four jig placement portions 31 are each formed to have some concavity in the width direction Y from the one end surface 301 of the resin mold section 3. In addition, the jig placement portion 31 is open not only in the width direction Y but also in the thickness direction Z. The one end 21 in the width direction Y of the positive-electrode bus bar 2a or the negative-electrode bus bar 2b is exposed within the jig placement portion 31. The cross-section of the jig placement portion 31 perpendicular to the length direction X has concavity.

As shown in FIG. 5 (bottom view), the other end surface 302 in the width direction Y of the resin mold section 3 is provided with a total of four jig placement portions 32. Two jig placement portions 32 each are provided for the positive-electrode bus bar 2a and the negative-electrode bus bar 2b. The jig placement portion 32 is used for the placement of a jig (second jig 52) for supporting the other end 22 in the width direction Y of the positive-electrode bus bar 2a or the negative-electrode bus bar 2b. The two jig placement portions 32 corresponding to the positive-electrode bus bar 2a and the two jig placement portions 32 corresponding to the negative-electrode bus bar 2b are disposed alternately with each other in the length direction X.

As shown in FIG. 6 and FIG. 7 (both cross-sectional views), the four jig placement portions 32 are each formed to have some concavity in the width direction Y in a columnar shape from the other end surface 302 of the resin mold section 3. In addition, the other end 22 in the width direction Y of the positive-electrode bus bar 2a or the negative-electrode bus bar 2b is exposed on the bottom surface of the jig placement portion 32.

Next, the method for manufacturing the bus bar assembly 1 (1a) according to the first embodiment will be described with reference to FIG. 9 to FIG. 18. The method for manufacturing the bus bar assembly 1 (1a) according to the first embodiment has at least a bus bar placement process, a molding process, and a jig removal process.

In the bus bar placement process, the plurality of bus bars 2 (positive-electrode bus bar 2a and negative-electrode bus bar 2b) are disposed within a cavity 40 formed by a die 4 (first die 41 and second die 42), such as to be stacked in the thickness direction Z with a predetermined amount of space therebetween. In addition, the one end 21 and the other end 22 in the width direction Y of each bus bar 2 is supported by the jigs (first jigs 51 and second jigs 52). In the molding process, the cavity 40 of the die 4 is filled with an insulating resin 30. The plurality of bus bars 2 are molded into a single body by the insulating resin 30. The resin mold section 3 is thereby formed. In the jig removal process, the jigs (first jigs 51 and second jigs 52) are removed from the bus bars 2, and the jig placement portions 31 and 32 are formed in the resin mold section 3. The method will be described in detail below.

Figure 9:
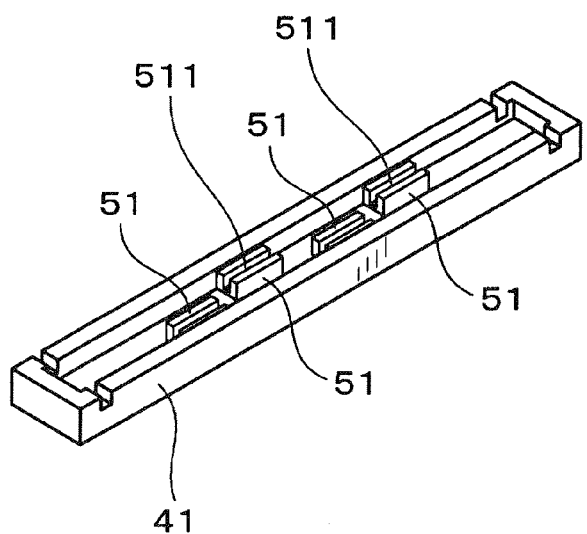
FIG. 9 shows a perspective view of a lower die of a die according to the first embodiment.

FIG. 9 illustrates a perspective view of a lower die of the die. As shown in FIG. 9, the first die 41 configuring a portion of the die 4 is prepared. Four first jigs 5 having concavity 511 are attached to the first die 41. The first jig 51 is configured separately from the first die 41. The cross-sections of the four first jigs 51 perpendicular to the length direction X of the first jigs 51 have concavity.

Figure 10:
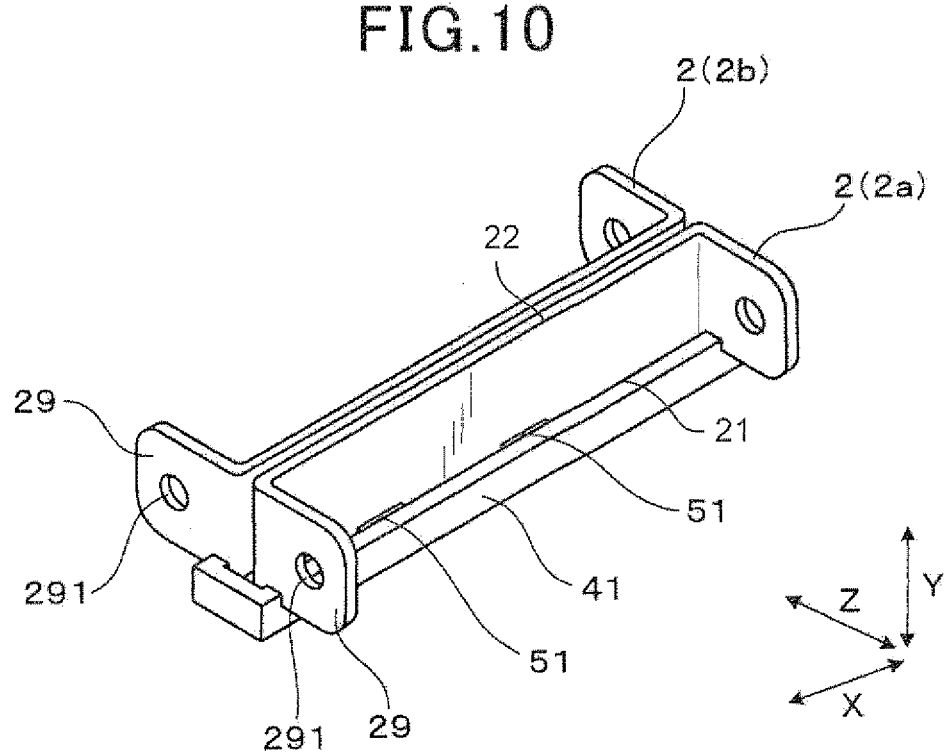
FIG. 10 shows a perspective view of a state in which a positive-electrode bus bar and a negative-electrode bus bar are disposed in the lower die of the die, according to the first embodiment.
Figure 11:
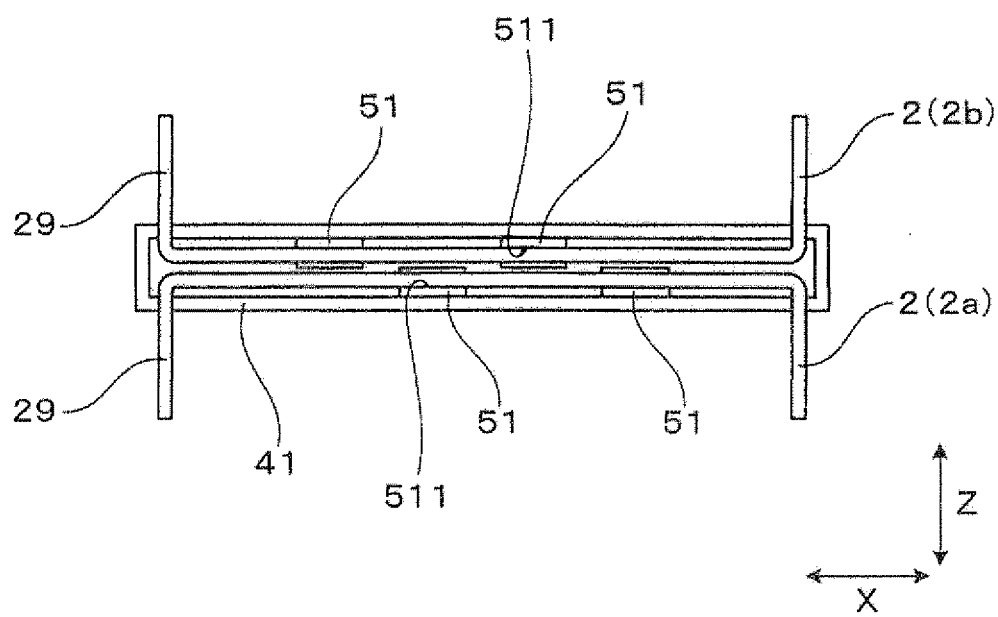
FIG. 11 shows a planar view of the state in which the positive-electrode bus bar and the negative-electrode bus bar are disposed in the lower die of the die, according to the first embodiment.

FIG. 10 illustrates a perspective view of a state in which the positive-electrode bus bar and the negative-electrode bus bar are disposed in the lower die of the die. FIG. 11 illustrates a planar view of the same state. As shown in FIG. 10 and FIG. 11, the positive-electrode bus bar 2a and the negative-electrode bus bar 2b are disposed within the concavity 511 of the four first jigs 51 in the first die 41. As a result, the positive-electrode bus bar 2a and the negative-electrode bus bar 2b are disposed such as to be stacked in the thickness direction Z with a predetermined amount of space therebetween. In addition, the positive-electrode bus bar 2a and the negative-electrode bus bar 2b are each in a state in which the one end 21 in the width direction Y is supported in the width direction Y and the thickness direction Z by the concavity 511 of two first jigs 51.

Figure 12:
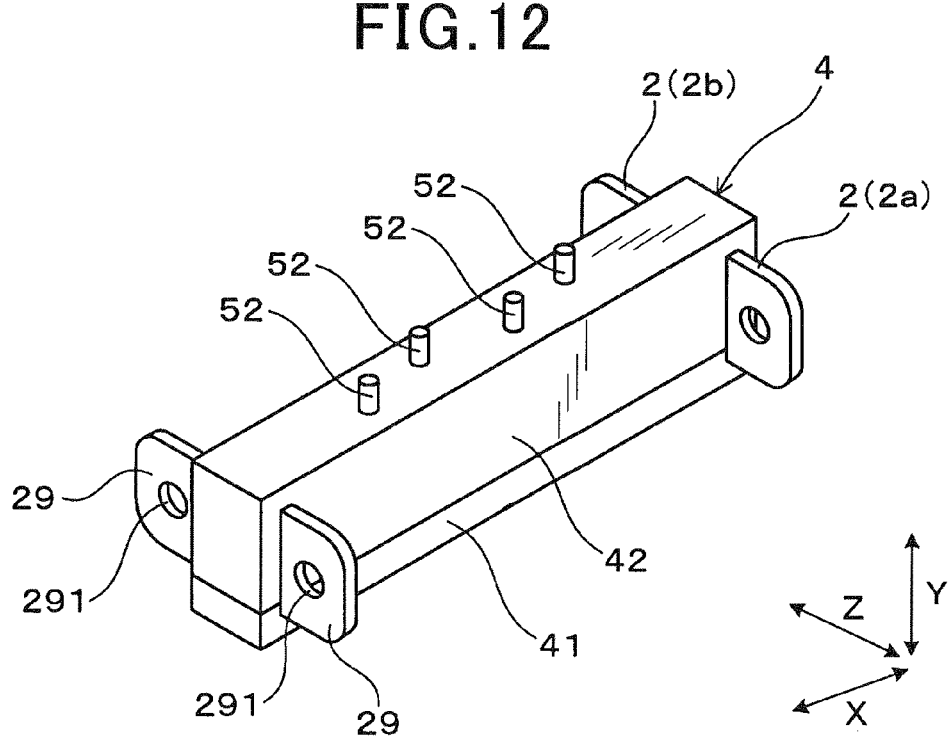
FIG. 12 shows a perspective view of a state in which an upper die of the die is disposed, according to the first embodiment.
Figure 13:
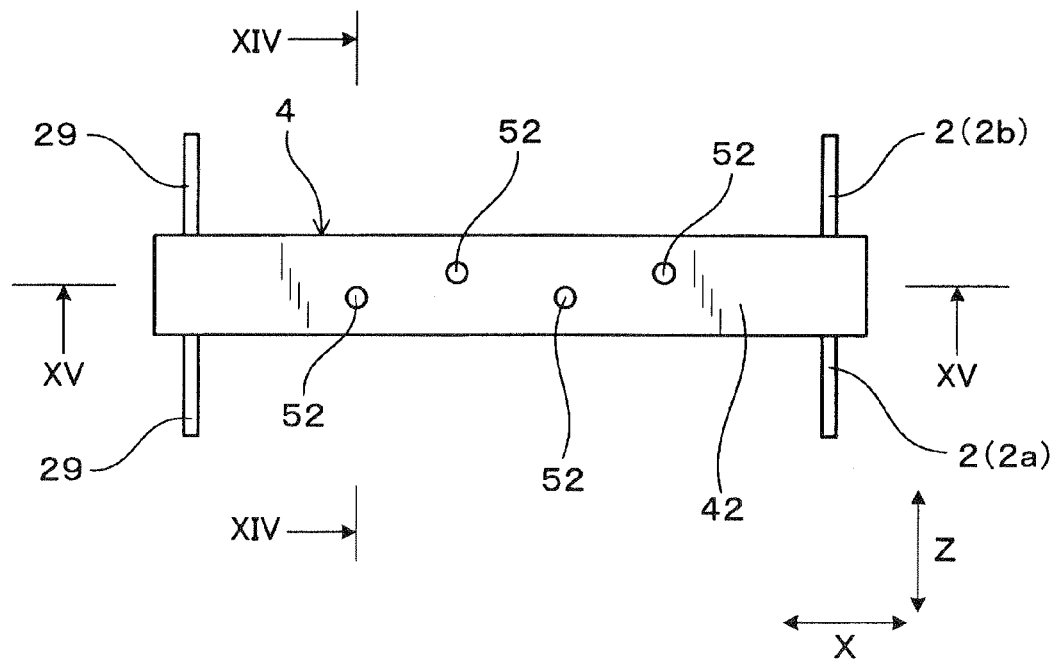
FIG. 13 shows a planar view of the state in which the upper die of the die is disposed, according to the first embodiment.
Figure 14:
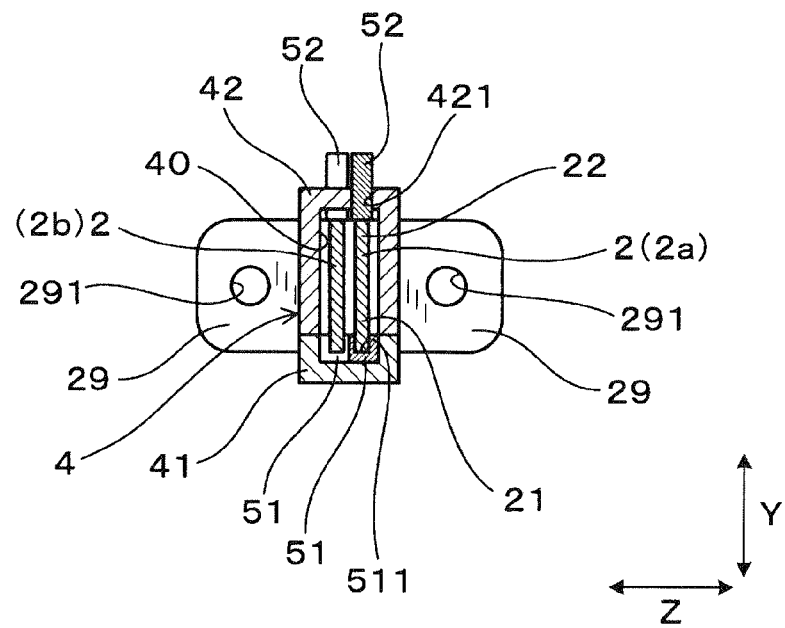
FIG. 14 shows a cross-sectional view taken along line XIV-XIV in FIG. 13, viewed from the arrow direction.
Figure 15:
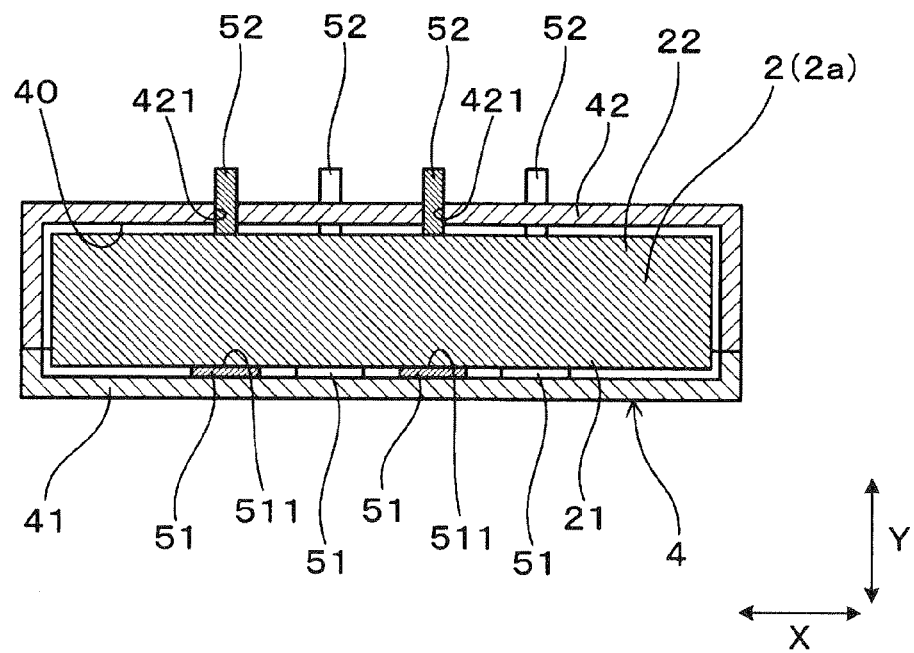
FIG. 15 shows a cross-sectional view taken along line XV-XV in FIG. 13, viewed from the arrow direction.

As shown in FIG. 12 to FIG. 15, a second die 42 that configures a portion of the die 4 is disposed. FIG. 12 illustrates a perspective view of a state in which the upper die of the die is disposed. FIG. 13 is a planar view of the same state. FIG. 14 illustrates a cross-sectional view taken along line XIV-XIV in FIG. 13, viewed from the arrow direction. FIG. 15 illustrates a cross-sectional view taken along line XV-XV in FIG. 13, viewed from the arrow direction. Four second jigs 52 each having a columnar shape are disposed such as to be inserted in four jig placement holes 421 provided in the second die 42. As a result, the positive-electrode bus bar 2a and the negative-electrode bus bar 2b are each in a state in which the other end 22 in the width direction Y is supported by two second jigs 52.

Figure 16:
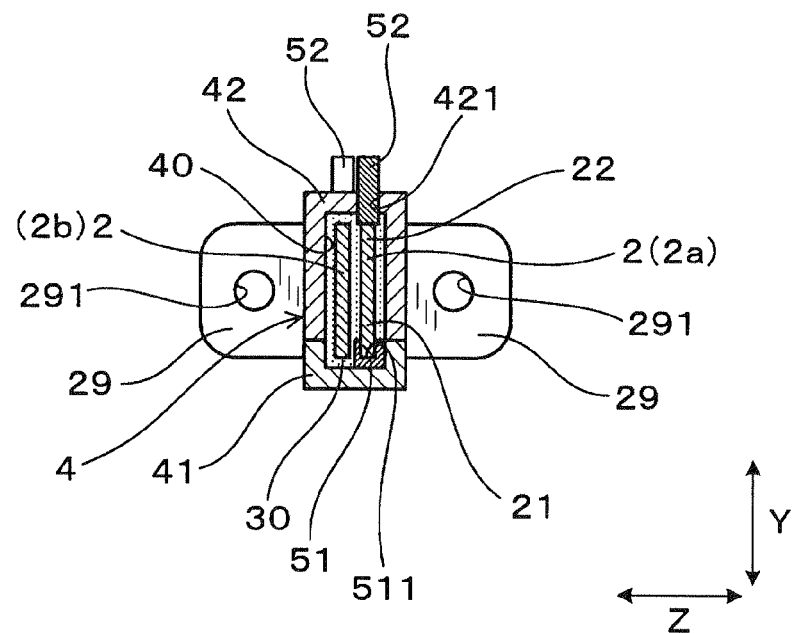
FIG. 16 shows a cross-sectional view of a state in which the cavity of the die is filled with an insulating resin, taken from a position similar to that in FIG. 14 and viewed from the arrow direction, according to the first embodiment.
Figure 17:
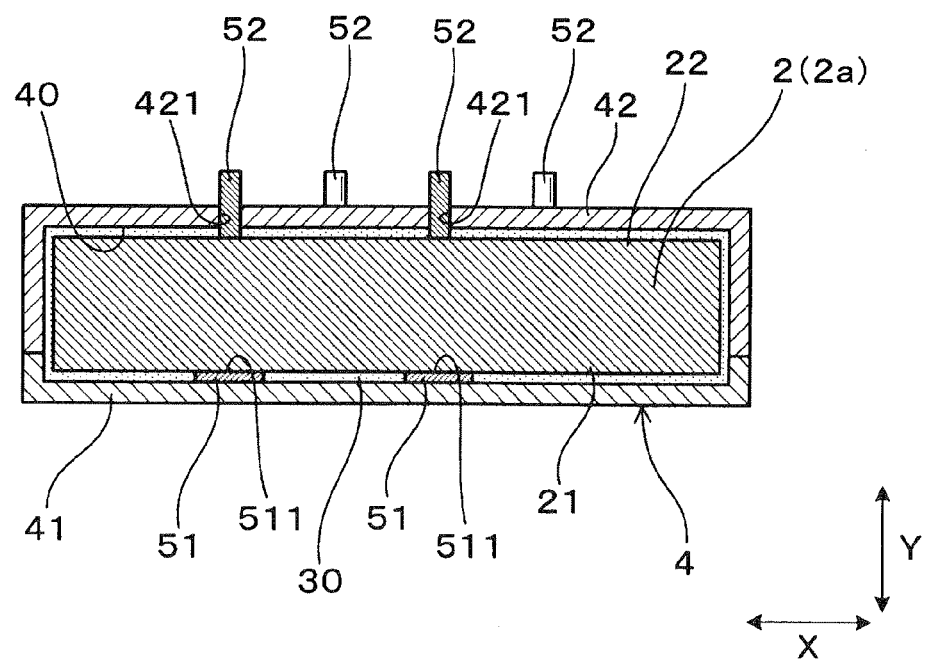
FIG. 17 shows a cross-sectional view of the state in which the cavity of the die is filled with an insulating resin, taken from a position similar to that in FIG. 15 and viewed from the arrow direction, according to the first embodiment.
Figure 18:
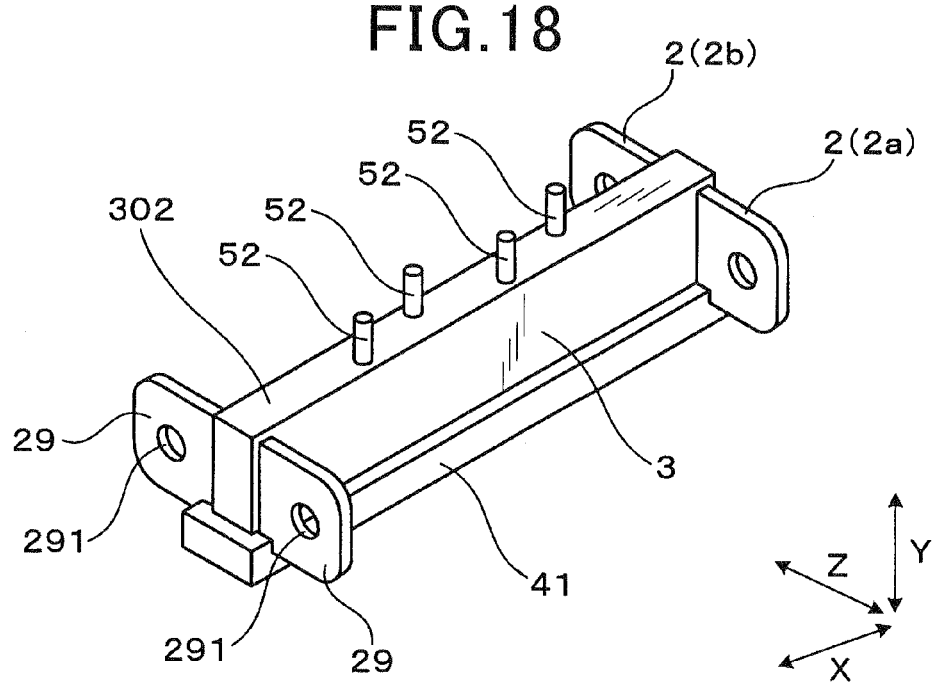
FIG. 18 shows a perspective view of a state in which the upper die of the die is removed, according to the first embodiment.

As shown in FIG. 16 and FIG. 17, the cavity 40 of the die 4 is filled with the insulating resin 30. The positive-electrode bus bar 2a and the negative-electrode bus bar 2b are thereby molded into a single body by the insulating resin 30. Here, FIG. 16 illustrates a diagram of a state in which the cavity of the die in FIG. 14 is filled with the insulating resin. FIG. 17 illustrates a diagram of a state in which the cavity of the die in FIG. 15 is filled with the insulating resin. Subsequently, the insulating resin 30 is hardened and the resin mold section 3 is formed. As shown in FIG. 18, the second die 42 is removed. Then, the first die 41, the four first jigs 51, and the four second jigs 52 are removed. FIG. 18 illustrates a perspective view of a state in which the upper die of the die is removed.

As a result of the method above, the bus bar assembly 1 (1a) shown in FIG. 2 to FIG. 8 is obtained. The jig placement portions 31 and 32 are respectively formed in the resin mold section 3 in the areas where the first jigs 51 and the second jigs 52 were placed.

Next, the working effects of the bus bar assembly 1 (1a) and the method for manufacturing the bus bar assembly 1 (1a) according to the first embodiment will be described. In the bus bar assembly 1 (1a) according to the first embodiment, the resin mold section 3 is provided with the jig placement portions 31 and the jig placement portions 32. The first jigs 51 are placed in the jig placement portions 31 and the second jigs 52 are placed in the jig placement portions 32. The first jigs 51 and the second jigs 52 are respectively used to support the one end 21 and the other end 22 in the width direction Y of each bus bar 2 when the plurality of bus bars 2 (positive-electrode bus bar 2a and negative-electrode bus bar 2b) are molded by the insulating resin 30. Therefore, when the plurality of bus bars 2 are molded by the insulating resin 30, the one end 21 in the width direction Y of each bus bar 2 is supported by the first jigs 51 disposed in the areas that becomes the jig placement portions 31 of the resin mold section 3. The other end 22 is supported by the second jigs 52 disposed in the areas to become the jig placement portions 32 of the resin mold section 3. As a result, the bus bars 2 can be accurately positioned.

In other words, for example, through-holes for placing the jigs to sandwich and fix the other bus bars in the thickness direction, as required in the past, are no longer required to be provided in the bus bar 2. Therefore, the facing area of adjacent bus bars 2 can be sufficiently ensured without enlarging the shape of the bus bar 2 itself. As a result, inductance in the bus bar assembly 1 (1a) can be sufficiently reduced.

In addition, according to the first embodiment, the jig placement portion 31 on the one end 21 has concavity in the cross-section parallel to the thickness direction Z and the width direction Y of the bus bar 2. As a result of the jig placement portions 31 of the resin mold section 3 having concavity, when the plurality of bus bars 2 are molded by the insulating resin 30, the one end 21 in the width direction Y of each bus bar 2 can be supported from both sides in the thickness direction Z by the first jigs 51 having concavity and disposed in the jig placement portions 31. In other words, the one end 21 in the width direction Y of the bus bar 2 can be supported not only in the width direction Y but also in the thickness direction Z. As a result, the bus bars 2 can be molded by the resin mold section 3 composed of the insulating resin in a state in which the bus bars 2 are accurately positioned by the first jigs 51 and the second jigs 52. Insulation between adjacent bus bars 2 can be sufficiently ensured. In addition, inductance can be further reduced.

In addition, the jig placement portions 31 and 32 respectively corresponding to the two bus bars 2 disposed adjacent to each other are provided alternately with each other in the length direction X perpendicular to the thickness direction Z of the bus bar 2. Therefore, distance between the jig placement portions 31 and 32 in the resin mold section 3 can be sufficiently ensured. As a result, the distance between adjacent bus bars 2 can be reduced and space can be saved. Compactness of the bus bar assembly 1 (1a) can be actualized. In addition, in the instance of a configuration in which portions of the bus bars 2 are exposed in the jig placement portions 31 and 32 as according to the first embodiment, the distance between bus bars 2 can be sufficiently ensured. As a result, insulation between the bus bars 2 can be sufficiently ensured.

In addition, in the method for manufacturing the bus bar assembly 1 (1a) according to the first embodiment, in the bus bar placement process, the plurality of bus bars 2 (positive-electrode bus bar 2a and negative-electrode bus bar 2b) are placed within the cavity 40 of the die 4. In addition, the one end 21 and the other end 22 in the width direction Y of each bus bar 2 are supported by the first jigs 51 and the second jigs 52. In the molding process, in a state in which the one end 21 and the other end 22 in the width direction Y of each bus bar 2 are supported by the first jigs 51 and the second jigs 52 and the bus bars 2 are sufficiently positioned, the plurality of bus bars 2 are molded by the insulating resin 30.

Therefore, as described above, for example, through-holes for placing the jigs to sandwich and fix the other bus bars in the thickness direction, as required in the past, are no longer required to be provided in the bus bar 2. Therefore, the facing area of adjacent bus bars 2 can be sufficiently ensured without increasing the size of the bus bar 2 itself. As a result, the bus bar assembly 1 (1a) in which inductance can be sufficiently reduced can be easily manufactured.

In addition, in the manufacturing method according to the first embodiment, the die 4 includes the first die 41 and the second die 42. The first die 41 is disposed on the one end 21 in the width direction Y of the bus bar 2. The second die 42 is disposed on the other end 22. The first die 41 is provided with the first jigs 51 having the concavity 511. In the bus bar placement process, the one end 21 in the width direction Y of each bus bar 2 is placed within the concavity 511 of the first jigs 51 in the first die 41. Therefore, the one end 21 in the width direction Y of each bus bar 2 can be supported in the width direction Y and the thickness direction Z by the concavity 511 of the first jigs 51 provided in the first die 41. In other words, the bus bars 2 can be accurately positioned by only the first die 41 of the die 4. As a result, in the bus bar placement process, positioning of the bus bars 2 is facilitated. In addition, when the bus bars 2 are placed in the concavity 511 of the first jigs 51 in the first die 41 first, the subsequent operation of disposing the second die 42 on the first die 41 can be facilitated.

In this way, according to the first embodiment, the bus bar assembly 1 (1a) in which inductance can be reduced and the method for manufacturing the bus bar assembly 1 (1a) can be provided.

(Second Embodiment)

Second embodiment of the present invention will hereinafter be described with reference to FIG. 19 to FIG. 25.

A second embodiment is an example that is a bus bar assembly 1b shown in FIG. 1, or in other words, an instance in which the number of bus bars 2 is three. As shown in FIG. 1, in a manner similar to that according to the first embodiment, the bus bar assembly 1 (1b) according to the second embodiment is applied to the power conversion device 8 that controls the three-phase alternating-current motor 89 for cruising that is mounted in a vehicle. The bus bar assembly 1 (1b) is disposed within the inverter 80 in a state in which the U-phase bus bar 2c, the V-phase bus bar 2d, and the W-phase bus bar 2e are molded into a single body by an insulating resin.

Figure 19:
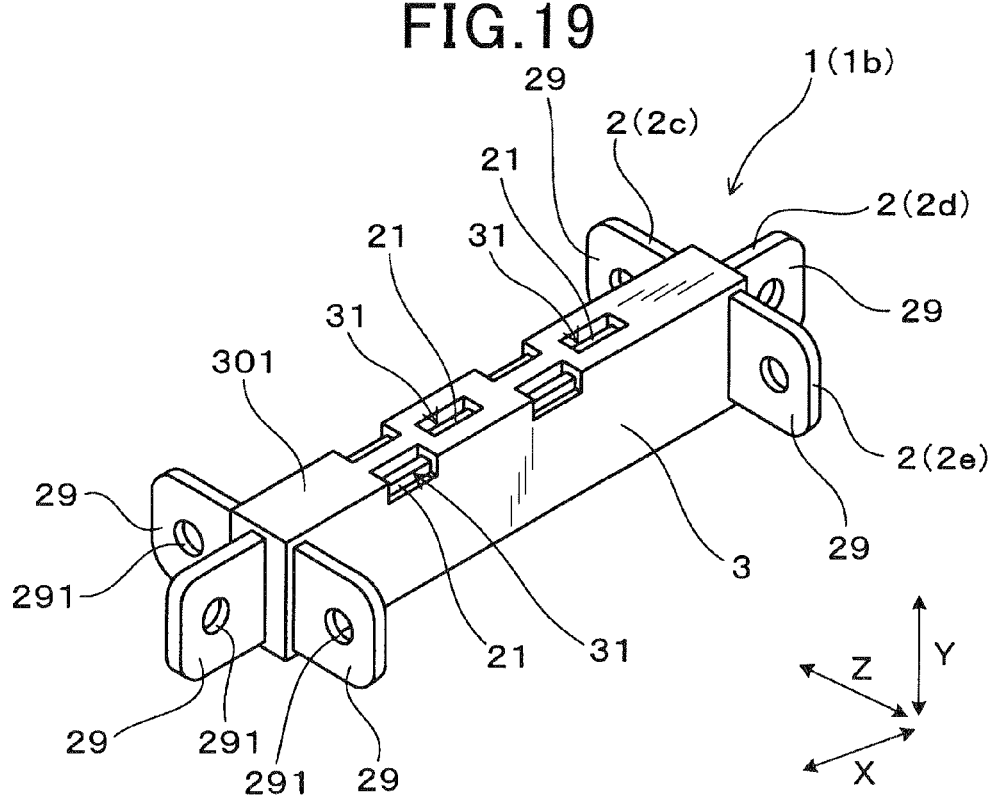
FIG. 19 shows a perspective view of a bus bar assembly according to the second embodiment.
Figure 20:
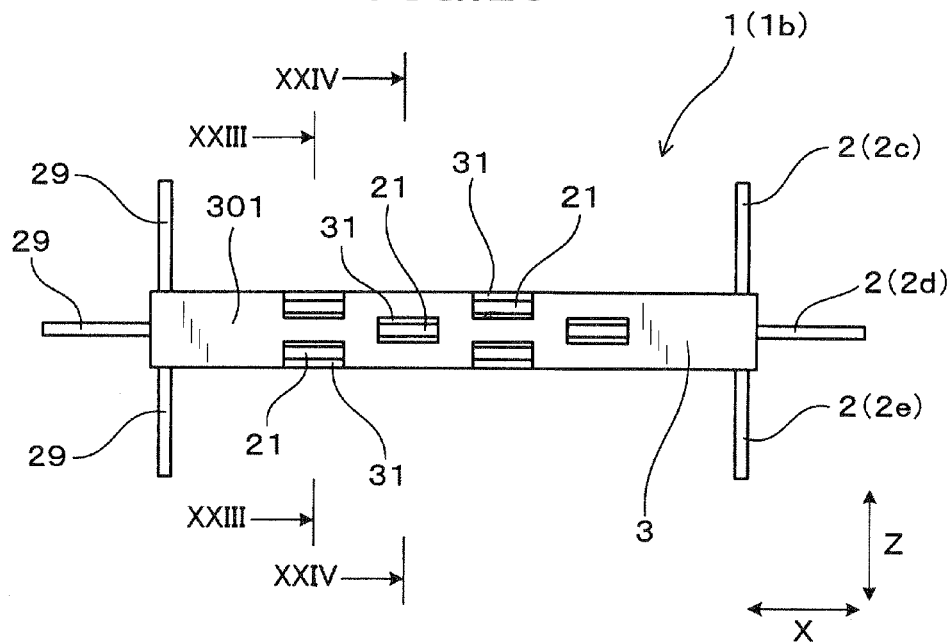
FIG. 20 shows a planar view of the bus bar assembly according to the second embodiment.
Figure 21:
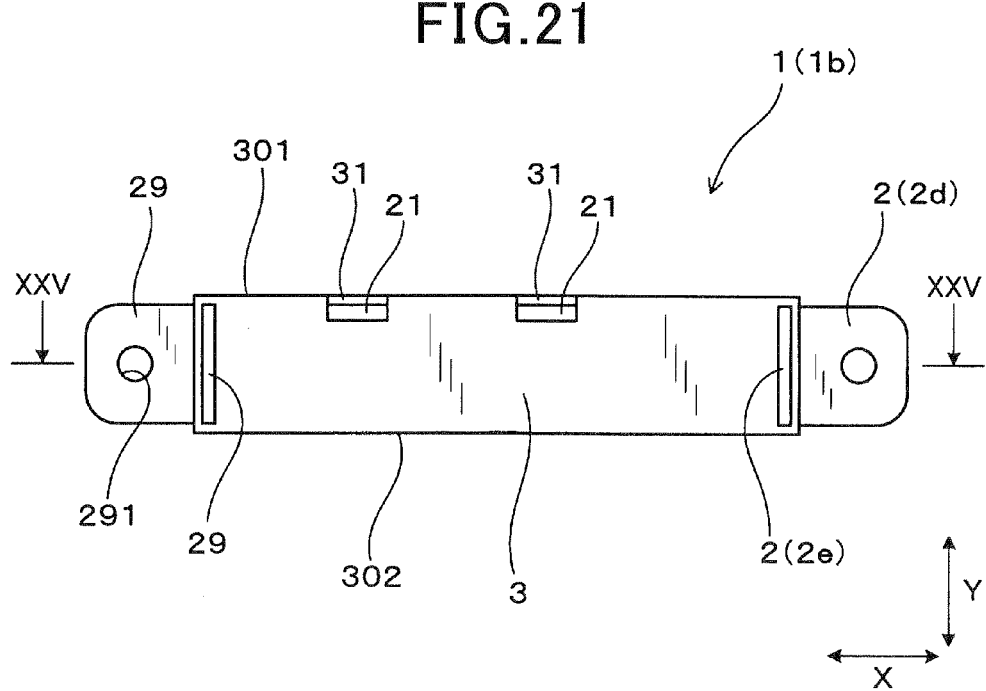
FIG. 21 shows a side view of the bus bar assembly according to the second embodiment.
Figure 22:
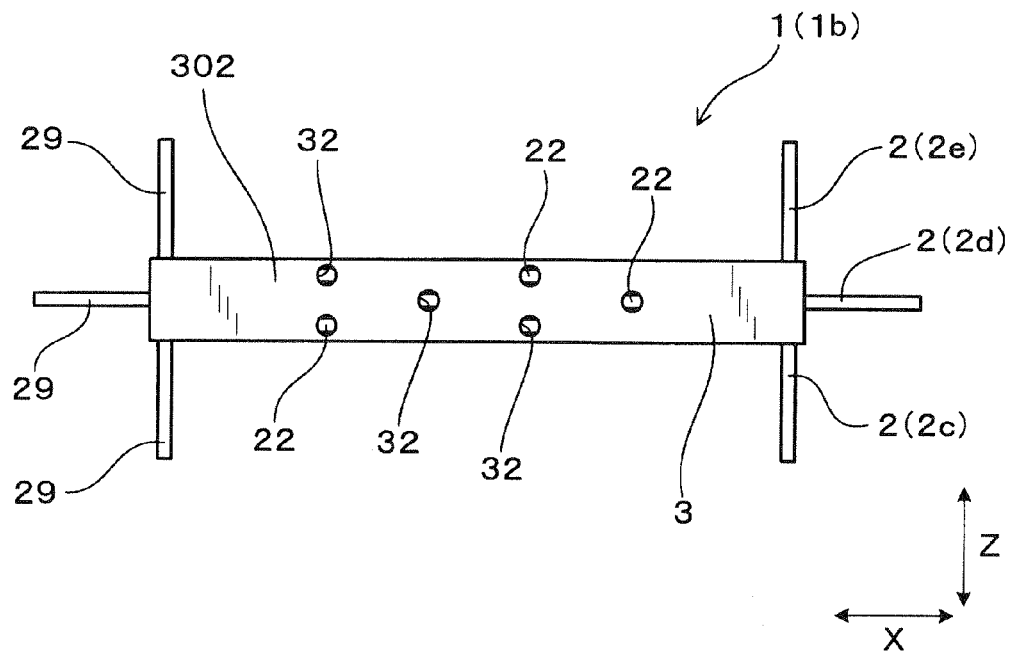
FIG. 22 shows a bottom view of the bus bar assembly according to the second embodiment.
Figure 25:
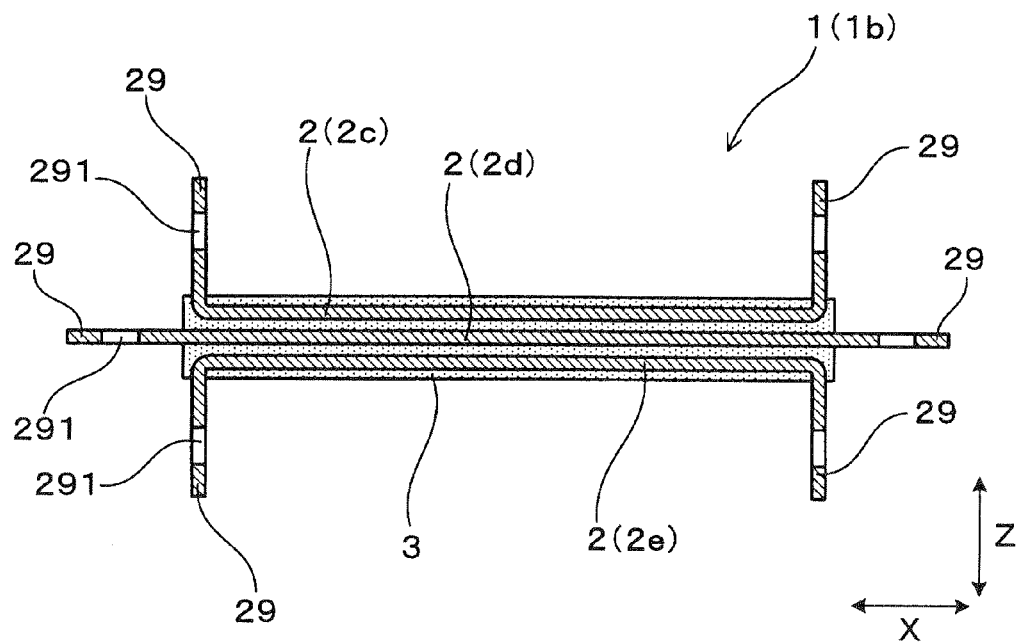
FIG. 25 shows a cross-sectional view taken along line XXV-XXV in FIG. 21, viewed from the arrow direction.

Specifically, as shown in FIG. 19 to FIG. 22, the bus bar assembly 1 (1b) includes three bus bars 2. Here, FIG. 19 illustrates a perspective view of the bus bar assembly according to the second embodiment. FIG. 20 illustrates a planar view of the bus bar assembly. FIG. 21 illustrates a side view of the bus bar assembly. FIG. 22 illustrates a bottom view of the bus bar assembly. In other words, the bus bar assembly 1 (1b) includes the U-phase bus bar 2c, the V-phase bus bar 2d, and the W-phase bus bar 2e. As shown in FIG. 25 (cross-sectional view taken along line XXV-XXV in FIG. 21, viewed from the arrow direction), the U-phase bus bar 2c, the V-phase bus bar 2d, and the W-phase bus bar 2e are stacked in the thickness direction Z with a predetermined amount of space therebetween. In addition, part of the stacked sections of the U-phase bus bar 2c, the V-phase bus bar 2d, and the W-phase bus bar 2e is molded into a single body by the resin mold section 3.

As shown in FIG. 19, the terminal portions 29 on both ends in the length direction X of the U-phase bus bar 2c and the W-phase bus bar 2e respectively project towards both sides in the thickness direction Z from the resin mold section 3. The terminal portions 29 on both ends in the length direction X of the V-phase bus bar 2d project towards both sides in the length X direction from the resin mold section 3. In addition, each terminal section 29 is provided with a fixing through-hole 291 for fixing the terminal portion 29 to another component.

As shown in FIG. 20 (planar view) and FIG. 21 (side view), the one end surface 301 in the width direction Y of the resin mold section 3 is provided with a total of six jig placement portions 31. Two jig placement portions 31 each are provided for the U-phase bus bar 2c, the V-phase bus bar 2d, and the W-phase bus bar 2e. The jig placement portion 31 is used for the placement of a jig (first jig 51) for supporting one end 21 in the width direction Y of the U-phase bus bar 2c, the V-phase bus bar 2d, or the W-phase bus bar 2e. The jig placement portions 31 corresponding to the V-phase bus bar 2d and the jig placement portions 31 corresponding to the U-phase bus bar 2c and W-phase bus bar 2e adjacent to the V-phase bus bar 2d are disposed alternately with each other in the length direction X. The shape of the six jig placement portions 31 is similar to that according to the first embodiment. See FIG. 23 (cross-sectional view taken along line XXIII-XXIII in FIG. 20, viewed from the arrow direction) and FIG. 24 (cross-sectional view taken along line XXIV-XXIV in FIG. 20, viewed from the arrow direction) regarding the shape.

Figure 23:
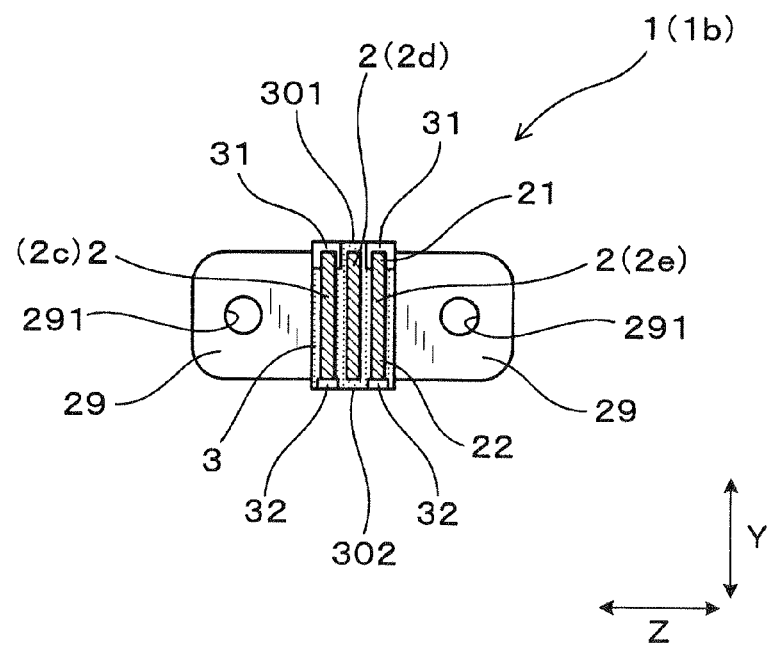
FIG. 23 shows a cross-sectional view taken along line XXIII-XXIII in FIG. 20, viewed from the arrow direction.
Figure 24:
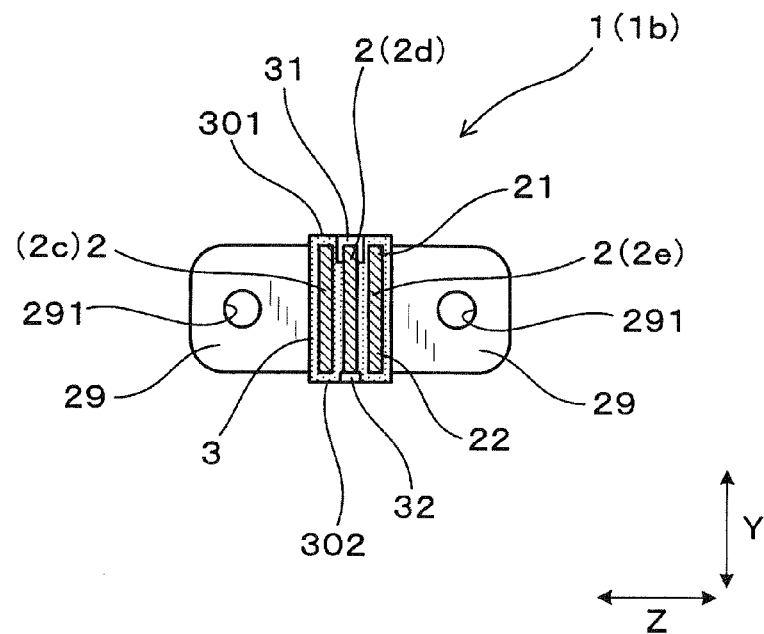
FIG. 24 shows a cross-sectional view taken along line XXIV-XXIV in FIG. 20, viewed from the arrow direction.

As shown in FIG. 22 (bottom view), the other end surface 302 in the width direction Y of the resin mold section 3 is provided with a total of six jig placement portions 32. Two jig placement portions 32 each are provided for the U-phase bus bar 2c, the V-phase bus bar 2d, and the W-phase bus bar 2e. The jig placement portion 32 is used for the placement of a jig (second jig 52) for supporting the other end 22 in the width direction Y of the U-phase bus bar 2c, the V-phase bus bar 2d, or the W-phase bus bar 2*e*. The jig placement portions 32 corresponding to the V-phase bus bar 2*d* and the jig placement portions 32 corresponding to the U-phase bus bar 2*c* and W-phase bus bar 2*e* adjacent to the V-phase bus bar 2*d* are disposed alternately with each other in the length direction X. As shown in FIG. 23 and FIG. 24, the shape of the six jig placement portions 32 is similar to that according to the first embodiment. Other basic configurations and the manufacturing method are similar to those according to the first embodiment. In addition, configurations similar to those according to the first embodiment are given the same reference numbers. Descriptions thereof are omitted.

The working effects according to the second embodiment will be described. According to the second embodiment, the bus bar assembly 1 (1*b*) includes three bus bars 2 (U-phase bus bar 2*c*, V-phase bus bar 2*d*, and W-phase bus bar 2*e*). In other words, for example, in a conventional structure, the number of through-holes provided for placement of the jigs increases as the number of bus bars 2 increases. The facing area of adjacent bus bars 2 decreases by an amount equivalent to the increase in the number of through-holes. Therefore, compared to an instance in which the number of bus bars 2 is two as according to the first embodiment, when the number of bus bars 2 is three, the effect achieved as a result of the above-described through-holes no longer being required in the bus bars 2 can be further achieved. In other words, the effect of sufficiently ensuring the facing area between adjacent bus bars 2 can be further achieved. Inductance can be further reduced. Other basic working effects are similar to those according to the first embodiment.

What is claimed is:

1. A bus bar assembly, comprising:
a plurality of conductive plate-shaped bus bars and a resin mold section, wherein
the plurality of bus bars are stacked in a thickness direction with a predetermined amount of space therebetween;
the resin mold section is composed of an insulating resin and formed such as to mold the plurality of bus bars into a single body and provided with jig placement portions which were being suitable for placing jigs for respectively supporting a first end and a second end in a width direction perpendicular to the thickness direction of each bus bar, when the plurality of bus bars were molded by the insulating resin;
the jig placement portions comprise a first jig placement portion on the first end configured to have a concavity in a cross-section in parallel to the thickness direction and the width direction of the bus bar;
the jigs comprise a first jig configured to be placed by the first jig placement portion, and to support the first end not only in the width direction but also in the thickness direction;
the plurality of bus bars comprise a positive-electrode bus bar and a negative-electrode bus bar, each of the positive-electrode bus bar and the negative-electrode bus bar having a main surface perpendicular to the thickness direction; and
the positive-electrode bus bar and the negative-electrode bus bar are disposed such that the main surface of one of the positive-electrode bus bar and the negative-electrode bus bar faces the main surface of the other of the positive-electrode bus bar and the negative-electrode bus bar.

2. The bus bar assembly according to claim 1, wherein the plurality of bus bars comprises at least three bus bars that are provided in the resin mold section of the bus bar assembly.

3. The bus bar assembly according to claim 1, wherein:
the plurality of bus bars comprises at least two bus bars; and
the jig placement portions respectively corresponding to two bus bars of the plurality of bus bars disposed adjacent to each other are provided alternately with each other in a length direction perpendicular to the thickness direction and the width direction of the bus bar.

4. The bus bar assembly according to claim 3, wherein the plurality of bus bars comprises at least three bus bars that are provided in the resin mold section of the bus bar assembly.

* * * * *